United States Patent [19]

Palardy

[11] Patent Number: 5,840,850
[45] Date of Patent: Nov. 24, 1998

[54] DEWATERING GLUTEN WITH ANIONIC SURFACTANTS

[75] Inventor: William J. Palardy, Chalfont, Pa.

[73] Assignee: BetzDearborn Inc., Trevose, Pa.

[21] Appl. No.: 916,826

[22] Filed: Aug. 22, 1997

[51] Int. Cl.[6] .................................................. A61K 35/78
[52] U.S. Cl. .......................... 530/374; 530/376; 426/18; 127/67; 514/2
[58] Field of Search .............................. 426/18; 530/374, 530/376; 127/67; 514/2

[56] References Cited

U.S. PATENT DOCUMENTS 3,928,631  12/1975  Freeman et al. ........................... 426/18
5,283,322  2/1994  Martin et al. ............................ 530/374
5,536,326  7/1996  Stocker ..................................... 127/67

*Primary Examiner*—Cecilia J. Tsang
*Assistant Examiner*—David Lukton
*Attorney, Agent, or Firm*—Alexander D. Ricci; Richard A. Paikoff

[57] ABSTRACT

Methods of enhancing the dewatering of gluten are disclosed. The methods comprise adding an anionic surfactant to the wet gluten prior to dewatering, as in vacuum dewatering equipment. Particularly effective surfactants are sulfates and sulfonates.

9 Claims, No Drawings

DEWATERING GLUTEN WITH ANIONIC SURFACTANTS

FIELD OF THE INVENTION

The present invention is directed to a method of improving the dewatering of gluten in grain processing. More specifically, the present invention is directed to the use of anionic surfactants to enhance the dewatering activity of vacuum dewatering equipment employed in corn gluten processing.

BACKGROUND OF THE INVENTION

The present invention relates to the dewatering of gluten during corn processing. The wet milling processing of shelled corn is employed to obtain staple products such as corn oil, dextrose, corn syrup, high fructose corn syrup, dextrins, dry starches and feeds. The principal steps in the wet milling of corn include steeping, milling, recovering and processing. During the steeping operation, corn kernels are softened by soaking in a hot dilute solution of sulfurous acid (i.e., sulfur dioxide). The softened kernels are then passed through grinding mills and separators where the germ is removed and the starch and gluten are separated from the coarser hull and fibers. The starch is then separated from the gluten which is added to the fibrous material and processed into a high protein animal feed. The starch is recovered as dry starch or further processed into dextrose and fructose. The sulfurous acid steepwater initially used to soften the corn contains solubles which are recovered for use in feeds. The steepwater solids are recovered by evaporation and drying. The solids recovered from evaporating and drying the steepwater are used as additives to livestock feeds to enhance their nutritional value.

Processing of the gluten also involves dewatering. Typically, the gluten stream is held in a light gluten storage tank prior to pumping to a bowl type centrifuge where the first step of dewatering begins. The gluten slurry from the centrifuge, called heavy gluten, is then sent to a vacuum dewatering system where the second step in the dewatering occurs. The gluten cake from the vacuum dewatering system is transported by auger to a dryer for final dewatering.

In the gluten dewatering process, the second step of vacuum dewatering is often the limiting factor in gluten recovery. The time necessary to reach the required gluten moisture content coupled with the potential for blinding of the filter media limits the throughput of gluten in this area. The present invention is directed to a process for decreasing the product cake moisture in the gluten dewatering process.

The use of surfactants in grain processing is known. U.S. Pat. No. 3,362,829 discloses a process for coating powdered vital wheat gluten with a nonionic hydrophilic lipid selected from the class consisting of monoglycerides, salts of lactylic esters of fatty acids, polyoxyethylene stearate and stearyl monoglyceridyl citrate. The coating of the powdered wheat gluten with such nonionic hydrophilic lipids is disclosed as controlling wetting of the vital wheat gluten upon hydrogenation. The use of polyoxyethylene sorbitan monostearate in combination with hydrophilic lipids is also disclosed. The surface active agent, i.e., polyoxyethylene sorbitan monostearate is included as an aid for the initial dispersion of the vital wheat gluten.

U.S. Pat. No. 3,880,824 discloses a gluten/lipid complex and process for preparing a gluten/lipid complex in which vital wheat gluten complexes with lipids are prepared which are resistant to particle cohesion. A finely divided vital wheat gluten is reacted with ionic and nonionic fatty substances selected from the group consisting of fatty acid chlorides, fatty monoglycerides, lactylic esters of fatty acids, phospholipids and sorbitan fatty acid esters in the presence of a mild base catalyst. The phospholipids and lactylic esters of fatty acids yield comparable complexes in an acidic environment.

U.S. Pat. No. 4,929,361 discloses a method of controlling the fouling of heat transfer surfaces in evaporators and concentrators employed in wet corn milling which comprises treating the wet corn solution with a nonionic surfactant such as polyoxyethylene 20 sorbitan R.

U.S. Pat. No. 5,283,322 discloses a method of improving the dewatering of gluten, e.g. gluten from the corn wet milling process, through the addition of nonionic surfactants to the process stream.

SUMMARY OF THE INVENTION

The present invention provides a process to enhance the removal of water from wet gluten in a gluten dewatering operation. The present inventor discovered that the addition of an anionic surfactant to a wet gluten stream prior to dewatering enhanced the dewatering ability of vacuum equipment. Particularly effective at enhancing vacuum dewatering are sulfates and sulfonates.

DESCRIPTION OF THE PREFERRED EMBODIMENT

The present inventor discovered that surfactants and more particularly anionic surfactants effectively enhance the dewatering of gluten in vacuum dewatering equipment. Typically, in the processing of corn gluten the dewatering operation is the limiting factor in gluten recovery. Conventionally, the dewatering of gluten is a multiple step operation comprising centrifuge dewatering followed by vacuum dewatering and thereafter drying. The vacuum dewatering equipment limits gluten production rates due to the time consuming nature of the operation.

It has been discovered that adding anionic surfactants, particularly sulfates and sulfonates, at concentrations of 100 to 2500 ppm (based on treatment actives content and the dry solids content of the gluten slurry) enhances the efficiency of the mechanical dewatering process by reducing the gluten effluent moisture. Laboratory tests demonstrated that this moisture can be reduced by approximately 1 to 2% absolute, which translates to a process energy reduction of 225 to 475 BTU per standard bushel of corn, assuming typical wet milling process yields. While efficacy at dosage levels below 100 ppm was not tested, it is anticipated that an improved dewatering effect of these treatments would occur. The level of treatment dosage will depend on the particular corn gluten slurry being treated.

EXAMPLES

All tests were conducted using process samples provided by a major U.S. corn wet milling facility. Samples were composed of concentrated gluten slurry after the dewatering centrifuge and before the rotary vacuum filter.

A standard filter leaf test apparatus was used to simulate the rotary vacuum filter. The media assembly was modified to allow filter paper to be used instead of filter cloth. This eliminated any potential residual effect in sequential treatment testing, as well as gradual fouling of the cloth with proteins in the gluten.

The experiments consisted of placing the gluten slurry sample at approximately 110° F. into an agitated beaker. The vacuum level was established at 17" Hg. The beaker agitation was stopped, and the media assembly inserted into the gluten. After allowing 30 seconds for the cake to form, the assembly was removed from the beaker and inverted to allow drainage of filtrate from the assembly. Vacuum was maintained for an additional 30 seconds to simulate the cake drying time found in industrial rotary vacuum filters. The cake was then analyzed for percent moisture using a standard oven method. Experimental results are shown in Tables I and II, below. Note that negative values may be attributable to e.g., adhesion of free starch to the fiber, daily variations in the control (untreated) data, etc.

TABLE 1

Effect of Sulfates on Gluten Filter Cake Moisture

| Treatment | Dosage (ppm) | Moisture Reduction (Control-Treated, %) |
| --- | --- | --- |
| sodium alkyl aryl polyether sulfate | 500 | 0.73 |
| | 2500 | 1.16 |
| sodium 2-ethyl-1-hexyl sulfate | 100 | −0.34 |
| | 250 | −0.02 |
| | 500 | 1.36 |
| | 2500 | 1.59 |
| sodium dodecyl sulfate | 100 | 1.62 |
| | 250 | 0.30 |
| | 500 | 1.44 |
| | 2500 | 0.71 |

TABLE II

Effect of Sulfates on Gluten Filter Cake Moisture

| Treatment | Dosage (ppm) | Moisture Reduction (Control-Treated, %) |
| --- | --- | --- |
| sodium linear alkylbenzene sulfonate | 100 | 0.18 |
| magnesium sulfonate | 250 | −0.79 |
| | 500 | 1.41 |
| | 2500 | 1.62 |
| sodium hexadecyl diphenyl ether disulfonate | 250 | −0.21 |
| | 500 | 1.63 |
| | 2500 | 0.66 |
| sodium sulfonate | 100 | 0.40 |
| | 500 | 0.79 |
| | 2500 | 1.81 |
| sodium octyl sulfonate | 100 | 1.15 |
| | 250 | 0.36 |
| | 500 | 0.90 |
| | 2500 | 0.63 |
| sodium α-olefin sulfonate | 500 | 0.18 |
| | 2500 | 1.09 |
| sodium dodecylbenzene sulfonate | 500 | 0.38 |
| | 2500 | 0.54 |
| α-olefin sulfonate | 250 | −0.67 |
| | 500 | 0.64 |
| | 2500 | 1.35 |

These tests indicate that anionic surfactants, particularly sulfates and sulfonates, at dosages o 100 to 2500 ppm (based on treatment actives content and the dry solids content of the gluten slurry) are effective in reducing the effluent cake moisture in corn gluten rotary vacuum filters by approximately 0.5 to 2.0 percent. Sulfates and sulfonates appeared to be the most effective anionic surfactants in improving the dewatering of gluten in laboratory tests. The sulfates and sulfonates listed should be considered representative of sulfates and sulfonates in general and should be regarded solely as illustrative without restricting the scope of the invention.

Sodium dodecyl sulfate (commonly referred to as sodium lauryl sulfate) and sodium octyl sulfonate yielded cake moisture reductions at dosages as low as 100 ppm active, dry solids basis. Sodium 2-ethyl, 1-hexyl sulfate, at dosages of 500 and 2500 ppm reduced filter cake moisture nearly as much as sodium dodecyl sulfate at 100 and 500 ppm. Sodium alkyl aryl polyether sulfate, sodium hexadecyl diphenyl ether disulfonate, and α-olefin sulfonate also demonstrated efficacy at various concentrations.

Additional anionic materials were tested. Results are found in Table III, below.

TABLE III

Effect of Other Anionic Materials on Starch Filter Cake Moisture

| Treatment | Dosage (ppm) | Moisture Reduction (Control-Treated, %) |
| --- | --- | --- |
| dioctyl sodium sulfosuccinate | 500 | −0.35 |
| | 2500 | 0.21 |
| phosphated mono- and di-glycerides | 100 | −0.87 |
| N-lauroyl, N, $N^1$, $N^1$-ethylenediaminetriacetic acid | 500 | 0.57 |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method of enhancing the dewatering of gluten which comprises adding to an aqueous gluten solution prior to dewatering, an effective dewatering amount of an anionic surfactant.

2. The method as recited in claim 1 wherein from about 100–2500 ppm of the anionic surfactant is added to the aqueous gluten solution prior to dewatering.

3. The method as recited in claim 1 wherein said anionic surfactant is a salt of a sulfonic acid or a sulfuric acid ester.

4. The method as recited in claim 3 wherein said sulfuric acid ester salt is selected from the group consisting of a sodium alkyl aryl polyether sulfate and a sodium alkyl sulfate.

5. The method as recited in claim 4 wherein said sodium alkyl sulfate is sodium dodecyl sulfate or sodium 2-ethyl-1-hexyl sulfate.

6. The method as recited in claim 3 wherein said sulfonic acid salt is selected from sodium hexadecyl diphenylether disulfonate and a sodium alkylbenzene sulfonate.

7. The method as recited in claim 3 wherein the anionic surfactant is a magnesium or sodium salt of a sulfonic acid.

8. A method of enhancing the vacuum dewatering of wet corn milling gluten which comprises adding to the wet corn milling gluten, prior to vacuum dewatering, an effective dewatering amount of an anionic surfactant.

9. The method as recited in claim 8 wherein from about 100–2500 ppm of the anionic surfactant is added to the aqueous gluten solution prior to dewatering.

* * * * *